United States Patent Office 3,492,634
Patented Jan. 27, 1970

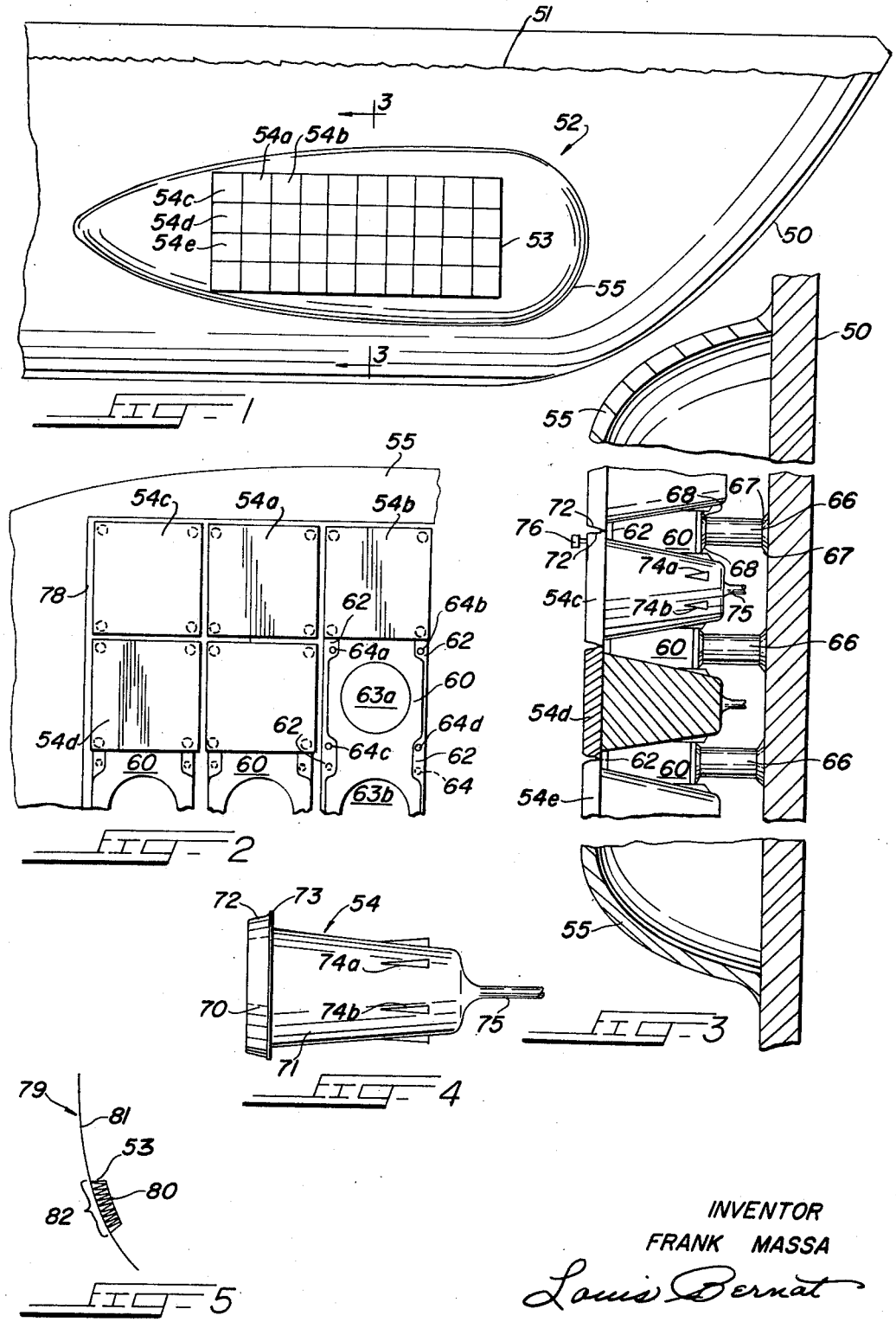

3,492,634
CONFORMAL ARRAY OF UNDERWATER
TRANSDUCERS
Frank Massa, Cohasset, Mass., assignor to Dynamics Corporation of America, Massa Division, Hingham, Mass.
Filed Dec. 26, 1967, Ser. No. 693,348
Int. Cl. H04b 13/00
U.S. Cl. 340—9   11 Claims

ABSTRACT OF THE DISCLOSURE

A conformal array of underwater transducers is attached to the outer hull of a ship or other vehicle. To do this an orthogonal array of structural members is welded to the outside of the hull, the spaces between these members forming transducer receiving openings. A plurality of transducer elements, individually enclosed in flexible, waterproof coverings, are forced into these transducer openings, their sound radiating faces forming a contour similar to the contour of the ship's hull. A waterproof sealant fills in all spaces between the transducers and any other discontinuities which could generate noise responsive to turbulences produced by motion of the ship through the water.

This invention relates to conformal arrays of underwater acoustical transducers used in sonar systems.

The term "conformal array" describes a field of independent transducers attached to the outside of the hull of a ship. Each transducer may be individually energized at times and in manners which control the shape and direction of resulting sonar beams. The system for so energizing the transducers is well known to those who are skilled in the art.

In greater detail, conformal arrays of the described types are very often mounted on a ship, a submarine, or a similar vehicle. The transducers in these arrays are arranged in fields having dimensions which are large as compared with the wavelength of the sonar sound. Usually, this field includes a large number of transducers arranged in a predetermined spacial relationship with respect to each other. Connected to the individual transducers is a switching network which selects and applies energizing signals to each of them. The time relationship is such that the successive transducers are energized after controllable delay periods. A result is that the entire field of transducers cooperate to produce a very sharp beam of sound. Variations in the controllable delays steer the sonar beam to point it in any desired direction.

Heretofore, the transducers making up the conformed array have been covered by a streamlined dome of sound transparent material. Thereafter, the dome was filled with water to provide an acoustic coupling between the transducers and the sea or other body of water supporting the ship. These domes have been used successfully with the sonar systems of the past; however, they have failed to meet the needs of certain new systems of advanced design.

While the reasons for such failures are irrelevant to the invention, it may, nevertheless, be desirable to here name a few so that the true importance of the invention may be better appreciated. First, the domes are quite expensive relative to the general cost of other parts of the system. Second, a use of lower frequency sonar signals requires larger domes, and they tend to become a technological limiting factor which precludes further development of the system. Therefore, many attempts have been made to eliminate the need for acoustic domes; however, these attempts have been unsuccessful thus far.

Among other things, to eliminate the domes, ships have had large holes cut into their hulls. Then a chestlike enclosure was attached inside the hull and over the hole. Transducers were then mounted in this chest and arranged to drive sound waves outwardly and into the water adjacent the ship. A thin skin of sound transparent material covers the hole to provide a flush outer surface for the hull. The radiating surfaces of these transducers may be bonded to the inside surface of the skin; or they may be arranged to drive into a coupling liquid which fills the chest.

In these and other similar systems, the forward motion of the ship causes turbulences around the conformal array which set up flexural vibration and other wave motions that interfere with normal operation of the associated sonar system. If the skin is supported to provide a rigidity which is adequate for precluding such flexural vibrations, the supports become sources of interference which preclude free and unobstructed transmission of sound between the transducers and the open sea. On the other hand, if the skin is made rigid enough to prevent flexural vibrations, there are refraction errors when sound waves reach the skin at other than a normal incidence.

Accordingly, an object of the invention is to provide new and improved conformal arrays of underwater transducers. In great detail, an object is to provide a field of transducers having a large, smooth, and continuous surface conforming to the shape of a ship's hull. More particularly, an object is to provide accurately positioned transducers, within the continuous surface, located and arranged to create a minimum disturbance responsive to the motion of the ship through the water.

Yet another object of the invention is to provide an array of transducers having a smooth and uninterrupted surface conforming to the contours of a ship's hull without requiring either an acoustic dome or a separate skin. In this connection, an object is to provide a streamlined conformal array having a surface flowing smoothly into the streamlines of the ship's hull. Here, an object is to provide a conformal array surface which is completely free of any discontinuities which might otherwise tend to generate noise responsive to the ship's motion.

Still another object is to provide a field of completely independent, individually waterproofed radiating surfaces driving directly into the sea.

In keeping with an aspect of the invention, a grid-like mounting frame or orthogonally related structural members is rigidly attached to part of an outer surface on the hull of a ship. A plurality of transducer elements are assembled in the space between the structural members. The acoustical radiating surfaces of the transducers are accurately positioned to drive outwardly into the sea. A flexible sealant fills all small spaces between the radiating surfaces. The contour of the frame, transducers, and sealant smoothly flows from a fairing surrounding the transducer field and along the streamlined lines of the hull. This structure provides a completely streamlined body, free of any noise generating discontinuities.

For a better understanding of exemplary structures accomplishing the above and other objects, reference may be made to the attached drawings, in which:

FIG. 1 is a plan view which shows a stylized ship's hull having a conformal array of underwater transducers mounted thereon;

FIG. 2 is an enlargement of the upper left-hand corner of the conformal array (shown in FIG. 1) with a few transducer elements removed from the mounting structure;

FIG. 3 is a cross-sectional view taken along line 3—3 of FIG. 1;

FIG. 4 is a side view which shows a transducer; and

FIG. 5 shows a cross-sectional view of a second embodiment of the invention utilizing a recessed window in the hull.

While these figures and the following specification refer to specific structures, it should be understood that the invention is not necessarily limited thereto. Quite the contrary, the appended claims are to be construed broadly enough to cover all equivalents reasonably falling within the true spirit and scope of the invention.

Briefly, a stylized ship's hull 50 is shown as having an underwear part which is below a water line 51. Mounted on the hull below this water line is a conformal array 52 of underwater transducers. The conformal aray 52 includes a rigid, grid-like mounting frame 53 attached to part of an outer surface of the hull 50. A plurality of transducer elements (such as 54a–54e) are assembled in the mounting frame 53 with their acoustical radiating surfaces accurately positioned to drive sound waves outwardly into the sea. The contour of the frame 53 and transducers 54 flows smoothly from a fairing 55 surrounding the transducer field and along the streamlined lines of the hull 50.

In greater detail, the grid-like frame includes a plurality of channel-like frame sections 60 arranged side-by-side. Each channel frame is provided with an aligned series of mounting tabs 62 and transducer receiving openings 63. Each tab 62 includes a pair of tapped mounting holes so that four such holes are concentrically located around each transducer receiving opening 63—as the holes 64a, 64b, 64c, 64d are concentrically located around the transducer opening 63a.

In order to attach the channel-like frame members 60 to the ship's hull, a plurality of mounting strips 66 are attached, in any suitable manner, to the hull 50, as by welding at 67, for example. The channel-like frame members 60 are attached to the mounting strips 66, again as by welding at 68, for example. The frame members 60 and mounting strips 66 are orthogonally oriented so that they form the grid-like structure 53 having a plurality of openings therein for nestingly receiving and supporting the transducers.

An important consideration is that all of the transducer receiving openings 63 must be accurately positioned according to the needs of the sonar system—usually this means that all openings 63 are equidistant from each other. Moreover, the mounting tabs 62 should lie in a continuous and smooth surface having contours which are those desired for the end-product conformal array of transducers. When the conformal aray is finished, this surface should be uninterrupted and free of any discontinuities which might cause unwanted noise generation responsive to the turbulent flow of water around the ship during its motion through the sea.

After the grid-like frame 53 is rigidly attached to the hull of the ship and the openings and tabs 63, 64 are accurately positioned relative to each other, the transducers 54 may be put into place in the frame.

While any suitable transducers may be used, I prefer a design which includes a vibratile flat piston surface, such as is shown in United States Patent No. 3,328,751, for example. Each transducer is completely covered with a flexible rubber-like compound which is molded in a general shape that should be apparent from an inspection of the drawings. This compound makes the individual transducers completely waterproof—even when the ship is moving through the water at full speed. For ease of identification, one of these transducers 54d is cross-hatched in FIG. 3 and is shown in some detail in FIG. 4.

Each transducer includes a flat vibratile plate piston section 70 which generates the sound waves that are driven out into the sea or other water. The somewhat truncated conical section 71 includes a transducer element for converting electrical signals into forces for mechanically driving the piston plate 70.

The face plate of the rubber-like housing is generally rectangular, as best seen in FIGS. 1 and 2. The corners of this face plate have counterbored mounting holes which coincide with the threaded mounting holes (such as 64a–64d) on the channel 60 and tabs 62. In profile (FIG. 4), the face plate 70 is somewhat tapered (as at 72), ending in a web-like lip or ridge 73. The tapered sections of adjacent transducers form a V-shaped groove for receiving a sealant, as shown at 72, 72 near the top of FIG. 3.

A number of projecting, semi-conical, tapered sections 74 are provided near the back of the housing 71. When the back 71 of the transducer is pushed into the holes 63 of the grid-like frame 53, these projections 74 are squeezed, and they act as shock absorbing resilient wedges for securing the transducers in place. Finally, the rear wall of the housing 71 is sealed to a waterproof cable 75 for providing the electrical connections between the transducer and its associated control circuits.

To assemble the conformal array of transducers, the end 71 of each transducer element 54 is pushed into one of the transducer receiving openings 63. The resilient conical wedges 74 are compressed to hold the rear of the transducer firmly, yet with some degree of shock mounting resilience. Screws or bolts (such as 76, FIG. 3) are passed through the countersunk mounting holes in the corners of the face plates 70 and then turned into the tapped holes 64 in tabs 62. This way, four screws or bolts are used to secure each transducer in place. The heads of the screws or bolts pass down into the countersunk regions of the soft rubber-like covering. The transducers are close enough together so that the thin ridges or web-like lips 73 are compressed together, thereby leaving the V-shaped grooves 72, 72 around each transducer face plate.

A resilient waterproof sealant is injected into all openings on the face of the conformal array of transducers. Primarily, these openings are the counterbored recesses above the heads of the mounting screws (such as 76) and the V-shaped grooves 72, 72. However, any other irregularities or imperfections are also filled. Then the sealant is carefully made smooth and flush with adjacent surfaces so that the entire conformal array has an uninterrupted and smooth streamlined surface—following any desired contour of the ship's hull. While the nature of the sealant is not too important, I prefer to use a flexible epoxy, polyurethane, or silicone rubber.

In an alternative construction, a compressible strip, such as a hollow rubber tube, is positioned under or between the transducers to be compressed by the face plates 70 when the transducers are bolted in place. Then the flexible sealant is applied, as described above.

The structure described thus far stands out, away from the hull of the ship, by a distance equal to the depth of a transducer element 54 plus any necessary clearance behind the transducer for wires 75. To preserve the streamlined nature of the hull contours and further to avoid noise generating discontinuities, the streamlined fairing 55 is added to frame the conformal array of transducers. The space 78 between the outer rows of transducers and the fairing is also filled with a sealant.

The above-described embodiment of the invention may be used to replace sonar domes attached to the outer surface of a ship's hull. However, the same principle may also be used to provide similar arrays when recessed windows may be provided in the ship's hull (FIG. 5) under the water line 79.

Here, the mounting frame 53 is put into a chest 80 welded to the inner side of the hull 81 and opening outwardly toward the sea and into the window 82. The depth of this chest is such that the face plates 70 of the transducers are flush with and therefore form a continuation of the ship's hull. This way, the sonar transducer array surface follows the exact contour of the ship's hull.

Still other embodiments will readily occur to those who are skilled in the art. Therefore, the appended claims are to be construed to cover all modifications falling within the true scope and spirit of the invention.

I claim:

1. A conformal array of underwater transducers for use on ships or other similar vehicles, said array comprising a streamlined frame structure attached to an underwater part of and blending in with the contours of the hull of said vehicle, said frame structure having a plurality of transducer receiving openings therein, a plurality of transducer elements affixed in said openings in close proximity with each other, the sound radiating parts of the transducers being aligned with the contours of the vehicle, and flexible sealing means filling the spaces between said transducers to provide a continuous and uninterrupted, smooth and steamlined surface, whereby said hull, said frame, and said transducers form a single, streamlined body for passing through the water without causing undue turbulent water noise.

2. A conformal array of underwater transducers for use on ships or other similar vehicles, said array comprising a frame structure attached to an underwater part of the hull of said vehicle and having a plurality of transducer receiving openings therein, a plurality of transducer elements affixed in said openings in close proximity with each other, each of said transducer elements comprising a flat vibratile sound radiating surface and a transducer housing portion, said surface and housing being sealed by a waterproof cover to form individual waterproof units, the sound radiating surfaces of the transducers being aligned with the contours of the vehicle, and flexible sealing means filling the spaces between said transducers to provide a continuous and uninterrupted, smooth and streamlined surface.

3. A conformal array of underwater transducers for use on ships or other similar vehicles, said array comprising a frame structure attached to an underwater part of the hull of said vehicle and having a plurality of transducer receiving openings therein, said frame structure comprising a grid-like frame of vertical and horizontal structural members, the spaces between said members providing said transducer receiving openings, a plurality of transducer elements affixed in said openings in close proximity with each other, the sound radiating parts of the transducers being aligned with the contours of the vehicle, and flexible sealing means filling the spaces between said transducers to provide a continuous and uninterrupted, smooth and streamlined surface.

4. A conformal array of underwater transducers for use on ships or other similar vehicles, said array comprising a frame structure attached to an underwater part of the hull of said vehicle and having a plurality of transducer receiving openings therein, a plurality of transducer elements affixed in said openings in close proximity with each other, the sound radiating parts of the transducers being aligned with the contours of the vehicle, the sound radiating part of each of said transducer elements comprising a flat piston plate vibratile sound radiating portion, said plate vibrator and a transducer driver portion being bonded together in a rubber-like, waterproof covering having thin web-like ridges which span the spaces between adjacent transducers when said transducers are in place in said frame, thereby closing one end of said spaces, and flexible sealing means filling the spaces between said transducers to provide a continuous and uninterrupted, smooth, and streamlined surface.

5. A conformal array of underwater transducers for use on ships or other similar vehicles, said array comprising a frame structure attached to an underwater part of the hull of said vehicle and having a plurality of transducer receiving openings therein, a plurality of transducer elements affixed in said openings in close proximity with each other, the sound radiating parts of the transducers being aligned with the contours of the vehicle, each of said transducer elements being separated from adjacent transducer elements by spaces, compressible strips filling one end of the spaces between the transducer elements and forming grooves for receiving a flexible sealant, and flexible sealing means filling the grooves between said transducers to provide a continuous and uninterrupted smooth and streamlined surface.

6. A conformal array of underwater transducers for use on ships or other similar vehicles, said array comprising a frame structure attached to an underwater part of the hull of said vehicle and having a plurality of transducer receiving openings therein, a plurality of transducer elements affixed in said openings in close proximity with each other, the sound radiating parts of the transducers being aligned with the contours of the vehicle, flexible sealing means filling the spaces between said transducers to provide a continuous and uninterrupted, smooth and streamlined surface, and a fairing structure surrounding the periphery of the conformal transducer array, said fairing structure projecting a smooth contour surface of said array for streamlining said array into the surface of the vehicle thereby permitting non-turbulent motion of said array through the water to achieve an efficient acoustic operation of said transducer array while the vehicle is in motion.

7. The array of claim 6 wherein said transducer elements include resilient web-like projections surrounding the outer surface thereof, said projections being compressed when said transducer elements are in the transducer receiving openings, said flexible sealant filling the spaces between the transducers and the spaces between the array and the fairing.

8. A conformal array of underwater transducers for use on ships or other similar vehicles, said array comprising a frame structure attached to a recessed portion in an underwater part of the outer surface of the hull of said vehicle, said array forming a continuous uninterrupted, smooth streamlined, radiating surface blending into a continuation of the outer surface of said vehicle, whereby said radiating surface of said conformal array is flush with the outer surface of said vehicle, said radiating surface comprising a plurality of transducer receiving openings in said frame, a plurality of transducer elements affixed in said openings, in close proximity with each other, the sound radiating parts of the transducers being aligned with the contours of the vehicle, and flexible sealing means filling the spaces between said transducers to provide a continuous and uninterrupted, smooth and streamlined surface.

9. A method of constructing a conformed array of transducers on the hull of a ship or other similar vehicle, comprising the steps of (1) attaching a mounting frame having transducer receiving openings therein to the hull of said ship, (2) forming a plurality of transducer elements individually sealed in flexible waterproof covers having shapes and sizes which enable them to be nestingly received in the transducer openings, (3) forcing said transducers into said openings, and (4) filling and covering the spaces between the transducers with a flexible sealant to provide a surface free of any discontinuities which are likely to generate noise in the water responsive to the motion of the ship travelling through the water.

10. The method of claim 9 and the step of surrounding the conformed array with a streamlined fairing frame.

11. The method of claim 9 and the step of recessing said conformal array in the hull of said vehicle, the surface of said conformal array providing a continuation of and following the contours of the hull of said vehicles.

References Cited

UNITED STATES PATENTS

| | | | |
|---|---|---|---|
| 2,407,243 | 9/1946 | Batchelder | 340—11 |
| 2,746,026 | 5/1956 | Camp. | |
| 3,210,724 | 10/1965 | Jones et al. | 340—11 |
| 3,230,503 | 1/1966 | Elliot et al. | 340—10 |
| 3,277,451 | 10/1966 | Parssinen | 340—9 X |
| 3,284,761 | 11/1966 | Douglas | 340—10 |

RODNEY D. BENNETT, JR., Primary Examiner

B. L. RIBANDO, Assistant Examiner